Feb. 28, 1950     M. E. LOVE     2,499,103
PET BED FOR VEHICLES
Filed March 27, 1946
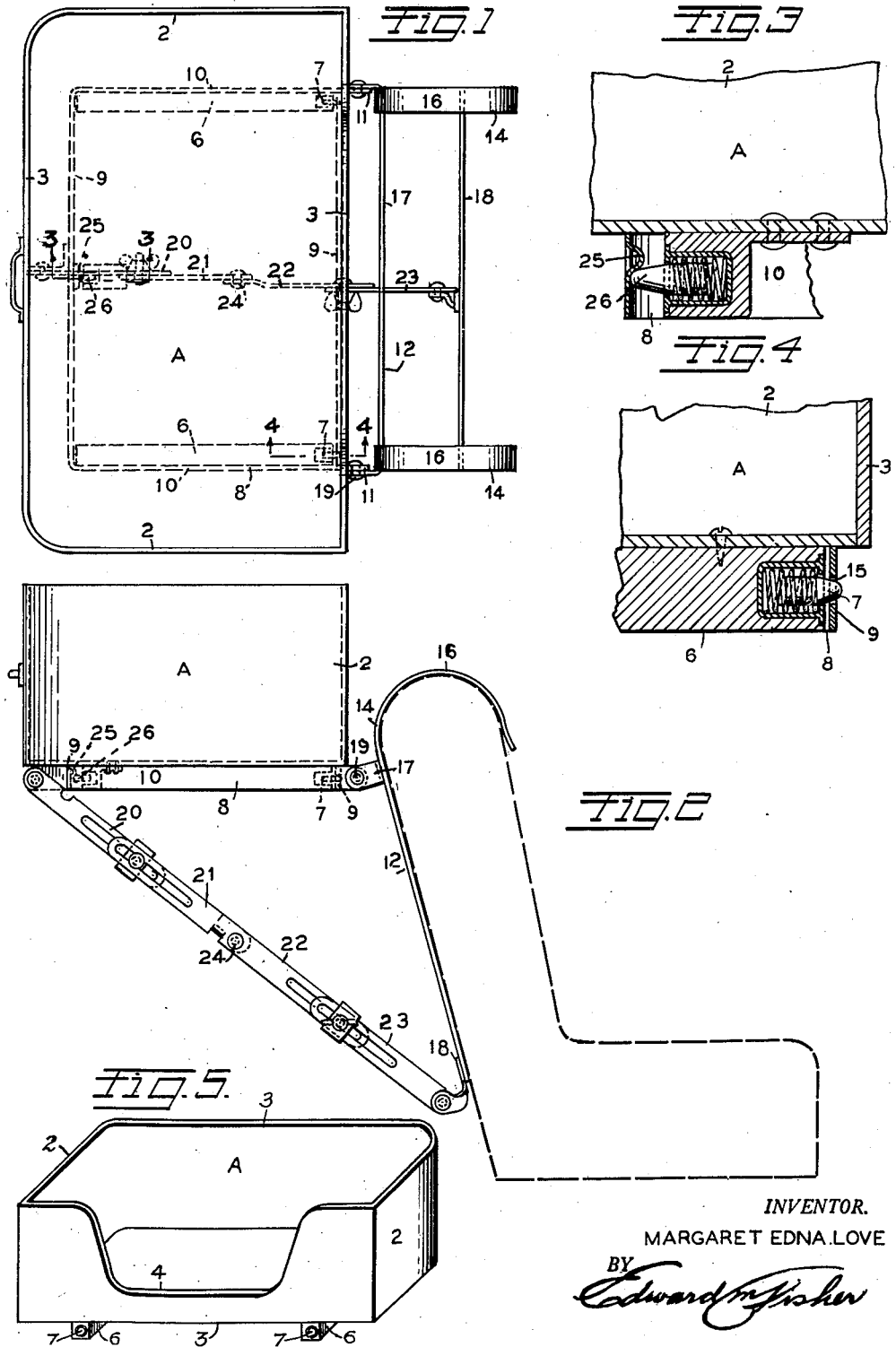
INVENTOR.
MARGARET EDNA LOVE
BY Edward M Fisher Patented Feb. 28, 1950

2,499,103

UNITED STATES PATENT OFFICE 2,499,103

PET BED FOR VEHICLES

Margaret Edna Love, Orlando, Fla.

Application March 27, 1946, Serial No. 657,551

2 Claims. (Cl. 224—42.43)

This invention is concerned with the provision of a pet bed for vehicles by means of which the bed and pet occupant thereof is carried on the back of a vehicle seat without interference with the vehicle occupants, and which, when not in use, may be collapsed to the back of the seat without removing the bed from the carriage frame.

Broadly it is an object of this invention to provide carriage means for a pet bed which consists generally in the combination of a collapsable frame adapted to be suspended over the back of a vehicle seat and adjustable to the vertical angle of said seat back to provide a horizontal base for said bed, with means arranged in a manner for removably engaging said bed with said frame so that when it is desired to remove said bed for use in a home, hotel or otherwise removal is effected by grasping the handle and pulling the bed from the frame thereby releasing the holding catch.

This invention resides substantially in the combination, construction, arrangement and relative location of parts, all in accordance with the disclosure herein.

In the accompanying drawings:

Figure 1 is a top plan view of a device in accordance with this invention.

Figure 2 is an end elevation thereof, and illustrating the invention in association with a vehicle seat.

Figure 3 is a fragmentary section on the line 3—3, Figure 1, illustrating the catch relation between the bed and the carriage frame thereof.

Figure 4 is a fragmentary section on the line 4—4, Figure 1, illustrating a manner of engagement of said bed with the inner portion of the carriage frame base.

Figure 5 is a perspective view of a bed adapted for embodiment with this invention, and illustrating fasteners for catch engagement of the bed with the carriage means for the bed.

The true nature and manner of use of a device in accordance with this invention will be best understood by a detailed description of the form thereof shown in the drawings in an illustrative sense.

This device includes a bed A which is preferably, as shown, of rectangular shape having a bottom member, end members 2 and side members 3, one of said side members being shaped as at 4 thus providing an entry thereto for a pet. Transversing the bottom of said bed and approaching the ends thereof are cleats 6 having inserted at one end thereof spring projected bullet fasteners 7 for catch engagement with the base of the carriage means for said bed. The bed comprises a rectangular base 8 preferably formed of strap material and having side members 9, inner side member having apertures 15, wherein catch engagement of the member 7 with the base 8 is completed. The end members 10 are extended beyond the inner side member thereby forming ears 11 provided with apertures thru which pivotal engagement is made with the carriage supporting frame 12. This frame 12 comprising spaced vertical suspension members 14, preferably of strap material, curved at their upper ends 16, in conformity with the normal conventional curvature of the top of a seat back, for hooking said curved ends over the seat back and suspending the carriage supporting frame therefrom. Fixed spacing of said suspension members 14 is supplied by connecting members 17 and 18 fixedly united with the said members by welding, soldering, brazing, riveting, or the like, towards the uppermost and lowermost portions of said suspension members, respectively, the outer ends of the member 17 being bent inward at right angle and having apertures thru which the hereinbefore mentioned pivotal engagement of the ears 11 with the supporting frame is consummated by means of pins 19.

Vehicle seat backs have a varying degree of slope, and in the suspension of the supporting members 14 they are gravity seated to said back, therefore, acquiring said back angle. The base 8 is horizontal when in use, Figure 2, and is thus supported by bracing means extended from the supporting frame 12. However to compensate for the varying degree of vertical angle of supporting members the said bracing means comprises a series of adjustable link members 20, 21, 22, and 23. For the collapsing of said device link members 21 and 22 have an eccentric pivotal connection at their respective inner ends as indicated at 24 the same being eccentric to prevent collapsing of the device when placed under weight or pressure.

As previously mentioned an object of this invention is to provide a means whereby the pet bed may be easily removed from the carriage for use as a bed in a home, hotel, or the like. To this end the outer side portion 9 at the approximate longitudinal center thereof is punched inward forming a curved tongue 25 and upon the bottom of the bed and fixed thereto at a point fitting to said tongue is a spring projected bullet catch 26, Figure 3. Observation of said figure will teach that as the bed is pulled away from the frame base 8 the round nose of the catch plunger, under spring tension, follows the curvature of the tongue 25 thereby urging said plunger into the plunger socket until contact with the tongue is completed and the plunger is released therefrom.

From the above description it will be apparent to those skilled in the art that the details of construction illustrated herein may readily be varied without departure from the novel subject matter herein disclosed, and especially is this true in standardizing the various parts. I do not, therefore desire to be strictly limited by the disclosure but rather by the claims granted me.

What I seek to secure by United States Letters Patent is:

1. A suspendible, adjustable and collapsible assembly for a vehicle seat-back, comprising a vertically swingable bed supporting base having protruding detachable pivotal suspension hook connection with the vehicle seat-back for disposition of said base in a horizontal plane, and a breakjointed brace hinged to the base and said hook connection, respectively, and having lockable extension sections at opposite sides of the breakjoint for effecting the leveling of the base in a horizontal plane, irrespective of the angular relation thereto of the seat-back when the said base is hooked to the same.

2. A suspendible, adjustable and collapsible assembly for a vehicle seat-back, comprising a vertically swingable bed supporting base having protruding detachable pivotal suspension hook connection with the vehicle seat-back for disposition of said base in a horizontal plane, a breakjointed brace hinged to the base and said hook connection, respectively, and having lockable extension sections at opposite sides of the breakjoint for effecting the leveling of the base in a horizontal plane, irrespective of the angular relation thereto of the seat-back when the said base is hooked to the same, and an occupancy bed counterseated in the base, and spring tensioned throw-bolt snap fasteners underlying the bed, interposed and concealed between it and the base adjacent to the counterseating area thereof for removably latching these together.

MARGARET EDNA LOVE.

REFERENCES CITED

The following references are of record in the file of this patent:

UNITED STATES PATENTS

| Number | Name | Date |
|---|---|---|
| 123,379 | Clark | Feb. 26, 1872 |
| 855,354 | Soucey | May 28, 1907 |
| 972,732 | Temple | Oct. 11, 1910 |
| 1,351,746 | Eberle | Sept. 7, 1920 |
| 2,224,999 | Mover | Dec. 17, 1940 |